(12) United States Patent
Karim

(10) Patent No.: US 8,732,080 B2
(45) Date of Patent: May 20, 2014

(54) SYSTEM AND METHOD FOR EXECUTING A FINANCIAL TRANSACTION

(75) Inventor: Aly Karim, Middlesex (GB)

(73) Assignee: Quercus (BVI) Limited (VG)

( * ) Notice: Subject to any disclaimer, the term of this patent is extended or adjusted under 35 U.S.C. 154(b) by 807 days.

(21) Appl. No.: 12/499,421

(22) Filed: Jul. 8, 2009

(65) Prior Publication Data

US 2010/0228669 A1      Sep. 9, 2010

Related U.S. Application Data

(60) Provisional application No. 61/157,097, filed on Mar. 3, 2009.

(51) Int. Cl.
*G06Q 40/00* (2012.01)

(52) U.S. Cl.
USPC .............. 705/42; 705/43; 705/35; 705/38

(58) Field of Classification Search
USPC ...................................................... 705/42
See application file for complete search history.

(56) References Cited

U.S. PATENT DOCUMENTS

| | | | |
|---|---|---|---|
| 6,112,191 A | 8/2000 | Burke | |
| 7,080,775 B2 | 7/2006 | Gorelick | |
| 7,171,370 B2 | 1/2007 | Burke | |
| 2003/0200163 A1 | 10/2003 | O'Riordan et al. | |
| 2004/0222285 A1 | 11/2004 | Pohl | |
| 2005/0080737 A1 | 4/2005 | Stein et al. | |
| 2005/0246289 A1 | 11/2005 | Alexander et al. | |
| 2006/0004655 A1 | 1/2006 | Alexander, IV et al. | |
| 2007/0033134 A1 | 2/2007 | Carretta et al. | |
| 2007/0080213 A1 | 4/2007 | Workman et al. | |
| 2007/0156579 A1 | 7/2007 | Manesh | |
| 2007/0294166 A1 | 12/2007 | Cello | |
| 2008/0082418 A1* | 4/2008 | Fordyce et al. | 705/14 |
| 2009/0048931 A1 | 2/2009 | Rabson et al. | |
| 2010/0145810 A1* | 6/2010 | Pourfallah et al. | 705/17 |
| 2010/0211445 A1* | 8/2010 | Bodington | 705/14.17 |
| 2010/0223187 A1* | 9/2010 | Fujita et al. | 705/75 |

FOREIGN PATENT DOCUMENTS

WO     WO-2007/104998     9/2007

* cited by examiner

*Primary Examiner* — Hai Tran
(74) *Attorney, Agent, or Firm* — Schiff Hardin LLP

(57) ABSTRACT

A computer-implemented system and method for processing one or more second transactions. The system and method provides for storage of customizable business rules, which are set by a user. Upon receipt of electronic digital information relating to a first transaction, the system and method initiate execution of one or more second transactions, which are controlled by the customizable business rules. As such, the second transactions are processed independently of the first transaction.

22 Claims, 4 Drawing Sheets

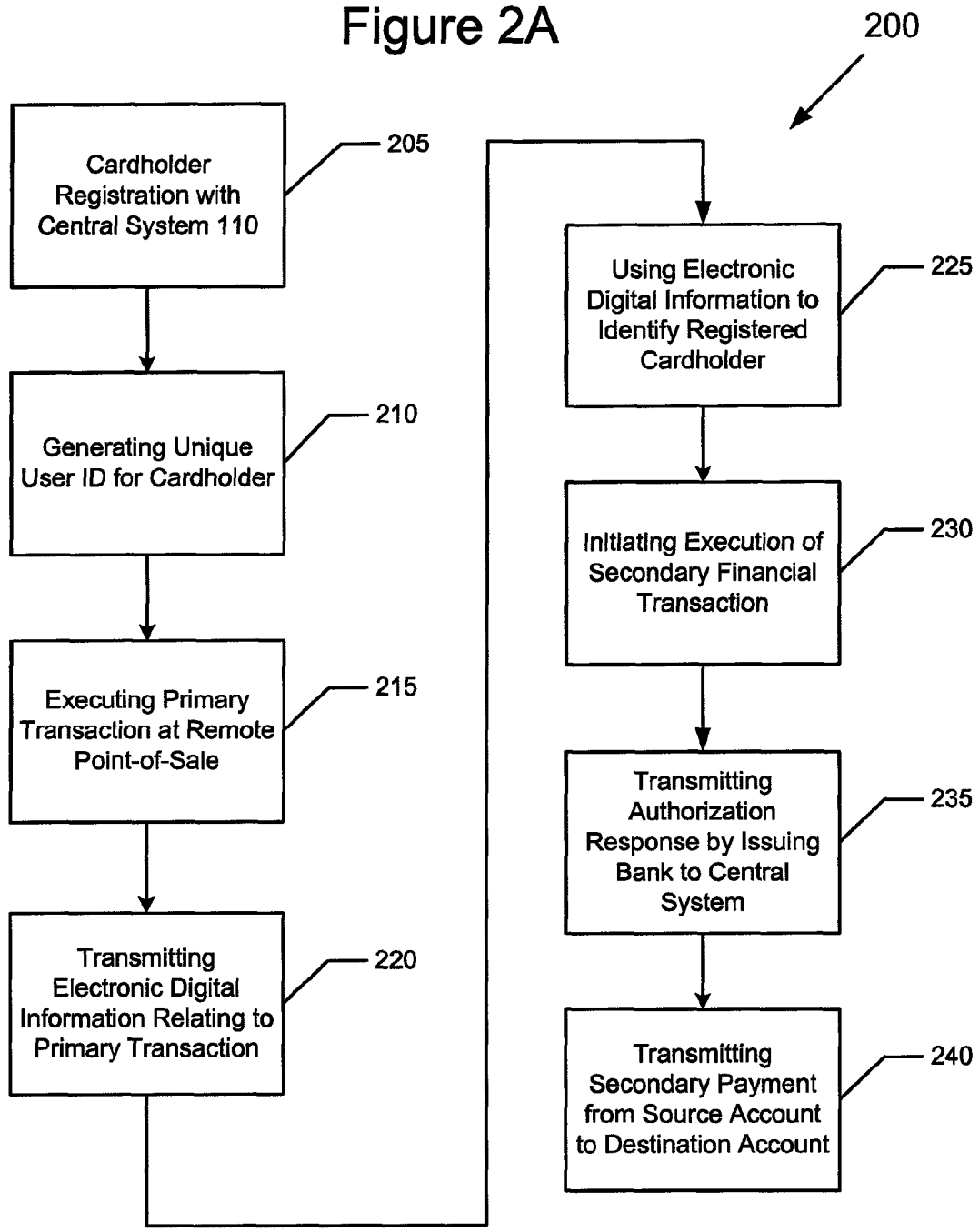

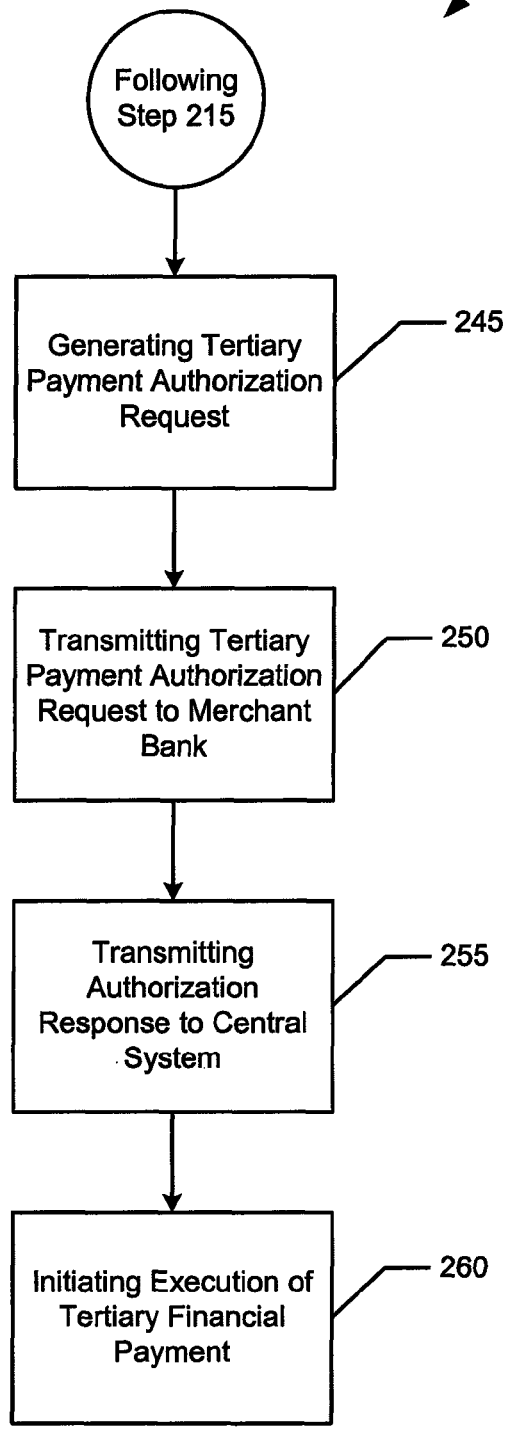

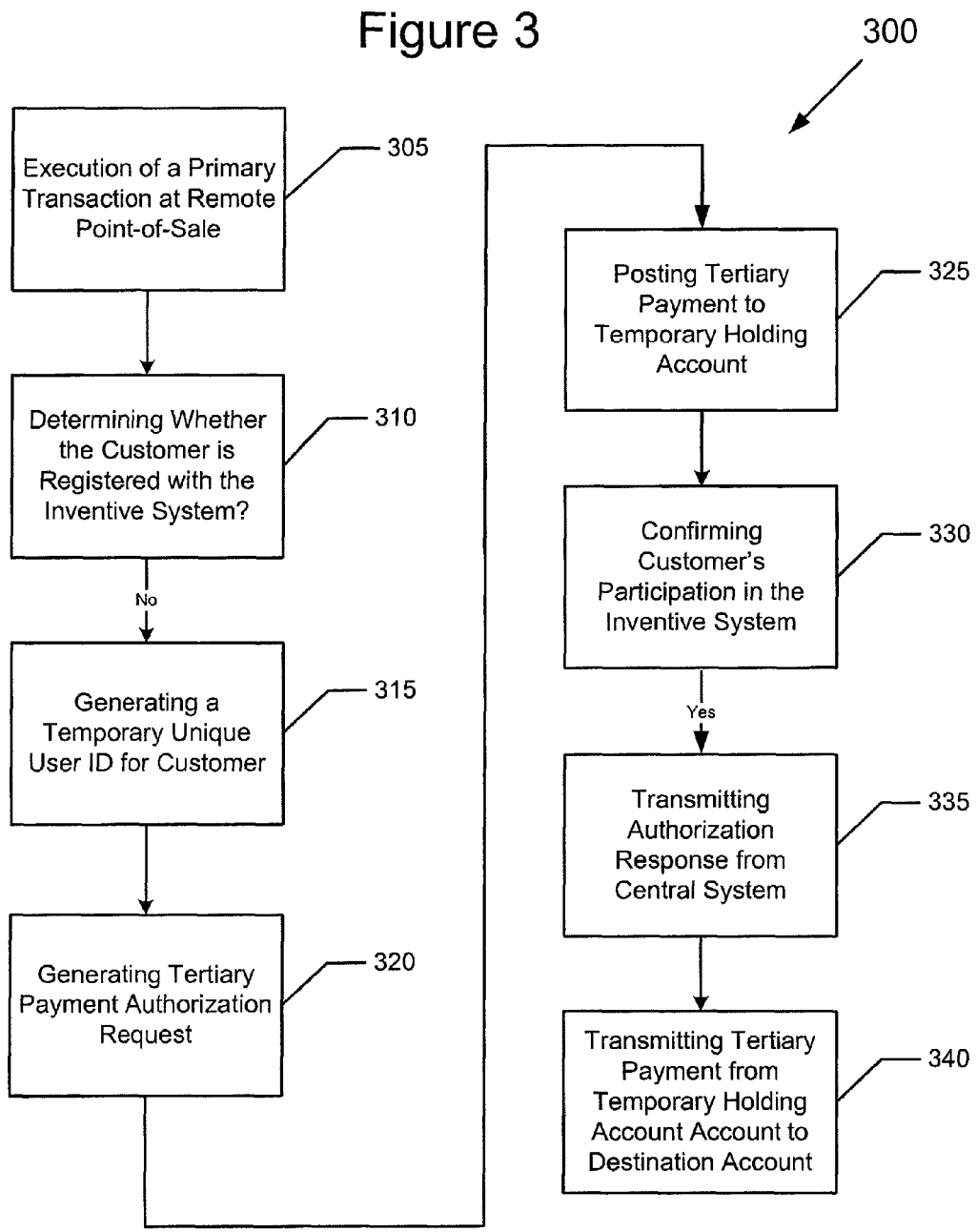

SYSTEM AND METHOD FOR EXECUTING A FINANCIAL TRANSACTION

CROSS REFERENCE TO RELATED APPLICATION

This application claims priority to U.S. Provisional Application No. 61/157,097, entitled SYSTEM AND METHOD TO FACILITATE AN OPTIMAL MODEL OF CONSUMPTION, SAVINGS AND INVESTMENT, filed Mar. 3, 2009, the contents of which are incorporated herein by reference into the present application.

TECHNICAL FIELD

The present invention relates generally to electronic funds transfer network transactions and, more particularly, to leveraging such transactions to achieve an optimal model of consumption, savings and investment. Furthermore, the present invention integrates a loyalty rewards program to maximize value from normal consumption behavior.

BACKGROUND OF THE INVENTION

Individuals often find it difficult to contribute a proportion of their income to savings; savings and investment is often unconditioned (non habitual) behavior and is seen by many as difficult to achieve. Furthermore, in many instances, consumers find it difficult to fund significant purchases without having to resort to consumer debt or the like. A shift away from funding purchases on credit to at least partially pre-funding them is preferred and often required.

Practically, it is much easier for an individual to find $1 or $2 per day than it is to find $500 or $1,000 out of what may already be overstretched budgets. It is generally accepted that the existing ratio of savings and investment relative to consumption is suboptimal and unsustainable and a solution is required that addresses the need to facilitate provisions for consumer savings and investment without curtailing consumer expenditure, particularly given that consumer expenditure accounts for 60-70% of total expenditure in the economy.

Given the trend to increasing life expectancy, there is increasing pressure on pensions to provide for individuals through their retirement years. It is therefore beneficial for individuals to save through all available means and to maximize the tax benefits that are available to them.

While existing processes and methods disclose the concept of "rounding up" a single transaction, none of the prior art concerns executing two independent financial transactions in which one or more second financial transactions are triggered by approval of a first financial transaction. For example, U.S. Patent Publication No. 2007/0294166 discloses a process for rounding or incrementing up to a preset multiple, a financial transaction using current and existing bank accounts. In particular, a transaction may be rounded-up to a multiple set by the enrollee, the service provider or the issuing bank. The difference between the rounded-up amount and the actual transaction amount will be earmarked for transfer.

SUMMARY OF THE INVENTION

There are, however, distinct implementation and processing advantages to the concept of independently executing two or more separate transactions that are not found in the prior art. Broadly, the invention provides a system that can be expanded globally to facilitate and incentivize habitual savings and investment based upon user specified targets. More particularly, the invention provides a business rationale for all participant stakeholders from users to the EFT networks to merchants and financial institutions. The invention has an integrated revenue model for all stakeholders and is based around a contribution scheme (financial rewards) as well as a revenue model that would facilitate a global expansion. This holistic approach benefits all parties in terms of revenue generating opportunities and other ancillary benefits.

In particular, the invention has back end integration with EFT networks (and any other participants) such that the information is shared to ensure that a successful primary transaction triggers a single or series of secondary and/or tertiary transactions. In particular, the invention provides a computer system for processing one or more second transactions which comprises a computer system configured to receive electronic digital information relating to a first transaction, and a transaction processor configured to initiate execution of a second transaction based on the electronic digital information, wherein the first transaction is processed independently of the second transaction.

The invention further provides for a computer-implemented method for processing one or more second transactions. The inventive method comprises storing customizable business rules, which are set by a user, in an electronic storage medium; receiving, by a computer system, electronic digital information, which relates to a first transaction; identifying the customizable business rules, by the computer system, based on the electronic digital information; and initiating, by a transaction processor, execution of a second transaction, which is controlled by the customizable business rules.

BRIEF DESCRIPTION OF THE DRAWINGS

FIGS. 2A & 2B illustrate a flowchart for a method for initiating execution of a second financial transaction in accordance with an exemplary embodiment.

FIG. 3 illustrates a flowchart for a method for initiating execution of a financial transaction in accordance with another exemplary embodiment.

DETAILED DESCRIPTION OF THE INVENTION

Figure 1:
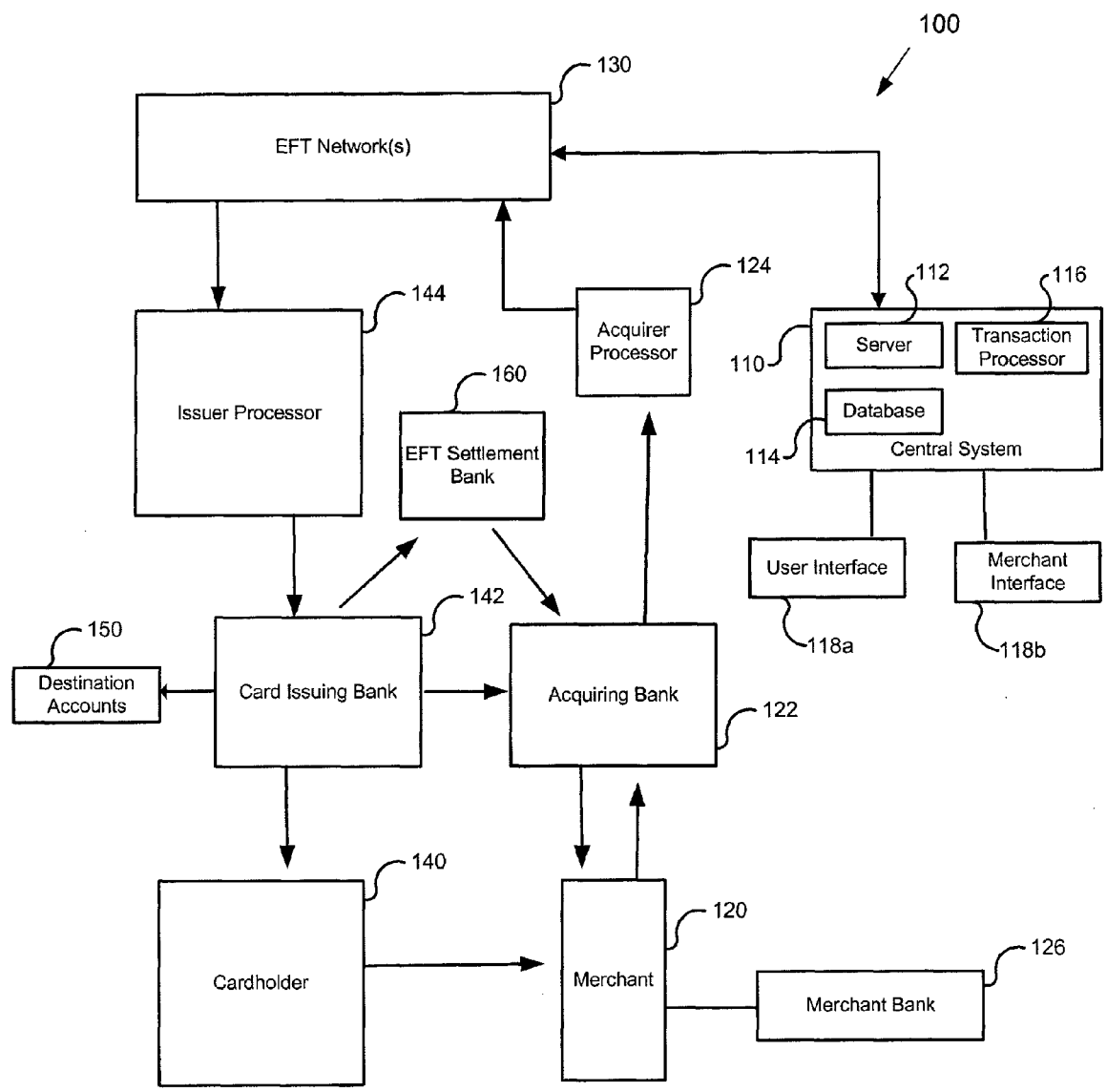
FIG. 1 illustrate a block diagram of the secondary financial payment system in accordance with an exemplary embodiment.

The following detailed description outlines possible embodiments of the proposed invention for exemplary purposes. The invention is in no way intended to be limited to any specific combinations of hardware and software. As will be described below, the inventive system and method triggers secondary and tertiary transactions by means of a series of payment instructions from an electronic funds transfer ("EFT") network to a central computer and database. The central computer and database collectively manage the distribution of funds according to customizable business rules defined by cardholders and merchants.

FIG. 1 illustrates a block diagram of the financial transaction network 100 in accordance with an exemplary embodiment of the present invention. Financial transaction network 100 is a system that links one or more EFT networks, users, merchants and financial institutions towards a common purpose of facilitating an optimal model of consumption, savings and investment. In essence, the inventive system and method establishes a symbiotic relationship among all entities by providing a methodology for habitual savings to the user while integrating merchant loyalty rewards. For avoidance of doubt, it is noted that the term "user" is used interchangeably with the term "cardholder" and/or "consumer" throughout this application.

As shown, FIG. 1 depicts an overall representation of the financial transaction network 100 that provides for a single or series of secondary and/or tertiary transactions, which are triggered by one or more primary transactions. Generally, a primary transaction is a conventional credit/debit card payment or the like, which is based upon standard authorization and settlement processes. The inventive system facilitates one or more secondary and/or tertiary transactions whose execution is prompted by the one or more primary transactions, but is otherwise independent of the primary transaction. It should be understood that the terms "primary", "secondary" and "tertiary" are used in this application in terms of sequence and not importance. For example, a "primary" transaction is a first transaction that triggers a secondary (i.e., second) transaction and/or tertiary (i.e., third) transaction. Furthermore, in other embodiments, the primary transaction triggers the secondary transaction, which, in turn, triggers the tertiary transaction or, in the alternative, the primary transaction triggers the tertiary transaction, which, in turn, triggers the secondary transaction.

The secondary and tertiary transactions are a single or series of independent payments initiated by the inventive system and mediated by the EFT card network(s), based upon user and/or merchant selected and controlled business rules. In the exemplary embodiment, a secondary transaction is a financial payment defined by a user and a tertiary transaction is a financial payment that is defined by the merchant. It should further be appreciated that business rules utilized by the inventive system are computerized processing statements that define or constrain some aspect of the processing of the secondary/tertiary transaction(s). The business rules are logical statements, customizable by both the user and merchant, that define how the secondary or tertiary payments are to be processed. For example, the rules may define the source account(s), destination account(s), the timing of the payments, etc. Further examples of the possible business rules will be discussed in detail below.

Central system 110 of FIG. 1 is configured to transmit and receive electronic digital data, via a transmission channel, switching service, modem or the like, to and from EFT network 130. EFT network 130 is provided by existing credit card providers to route digital data from banks, acquirers and/or issuers. FIG. 1 further illustrates merchant site 120, acquiring bank 122, acquirer processor 124, merchant bank 126, cardholder 140, card issuing bank 142, issuer processor 144, user-destination accounts 150, and EFT settlement bank 160.

In the exemplary embodiment, the secondary payments are made from card issuing bank 142 (or another source account as specified by the cardholder) and the tertiary payments are made from merchant bank 126 (or another source account as specified by the merchant) to user-designated accounts 150 whenever a primary transaction on a user's card is routed through the EFT network(s) 130. Although the secondary and tertiary transactions are triggered by the primary transaction, which occurs at merchant site 120, the actual processing and execution of the primary transaction at both the user side and the merchant side remains unchanged. As a result, there is no change in behavior for either cardholder 140 or merchant 120 after central system 110 has been integrated with an existing financial transaction network. Effectively, no additional processing costs would be incurred by the merchant, which could potentially dissuade implementation of the system by the merchant.

Central system 110 includes server 112, database 114 and transaction processor 116. It should be appreciated that in one embodiment a single computer can comprise one or more of these components. In alternative embodiments, however, these components are provided separately and coupled to one another for communication purposes, either locally or remotely. Server 112 further comprises all requisite hardware and software modules (not shown) to enable communication between central system 110 and remote entities, such as EFT network 130. These communication hardware components can include conventional I/O interfaces, such as modems, network cards, and the like. Such hardware components and software applications are known to those skilled in the art and have not been described in detail so as not to unnecessarily obscure the description of the invention herein.

In addition, server 112 further includes all hardware and software modules (not shown) that are necessary to provide a website portal for user interaction with central system 110. Specifically, it is contemplated that server 112 provides user interface 118a, via the website portal, that enables a user to register with central system 110 and predefine business rules. The inventive system is not limited to user registration via the system website. In alternative embodiments, central system 110 enables a user to register through a local bank or the like.

Utilizing user interface 118a, cardholder 140 can register one or more debit cards, credit cards, gift cards, prepaid cards, other electronic payment mediation services and devices such as mobile phones, SMS, SIM, RFI, and the like, with central system 110, which is configured to store this information in database 114. Database 114 may be any type of electronic storage medium. Central system 110 is further configured to generate and assign a unique user identification number ("ID") to the individual user 140. The unique user ID effectively links each of the registered cards to the particular user 140. As will become evident from the description below, one advantage in this regard is that a user is not required to use a single card only issued from a specific bank in order to utilize the inventive system and method. Rather, user 140 can designate any number and types of cards issued from any number of banks and vendors.

In an alternative embodiment, whenever a primary transaction is routed through an affiliated network, EFT network 130 will automatically trigger the generation of a unique user ID for cardholder 140 and establish a temporary user registration with central system 110. This step would apply for any user that has not yet registered with the system. As will be discussed below, once the temporary account is registered, the user will be contacted and prompted to confirm his or her participation in the inventive program.

In any event, once cardholder 140 has registered with the system and a unique user ID has been designated to cardholder 140, user interface 118a further enables the user to define business rules directing automated secondary payment to predetermined accounts 150 via a secure online control mechanism. In general, the predefined business rules specify the amount and destination of secondary transactions that will be automatically triggered following the successful authorization of a primary transaction at a remote point-of-sale, such as merchant site 120. In this regard, the business rules generally define the amount of the secondary transaction and the one or more secondary accounts 150 designated to receive the funds of the secondary transaction.

Based on the user's predefined business rules, one or more secondary transactions will be initiated by central system 110 to debit the user's source account and credit the specified destination account 150. More particularly once central system 110 receives electronic digital information concerning details of a primary transaction executed at a remote point-of-sale (e.g., merchant site 120), central system 110 analyzes the electronic digital information to determine whether the customer is registered with the inventive system. This process can be performed by searching database 114 to identify whether the credit card number used in the primary transaction has been registered in database 114. If so, transaction processor 116 determines whether one or more secondary transactions are required based on the registered user's customized business rules. It should be appreciated that transaction processor 116 may comprise a business rules engine or the like to execute one or more of the customizable business rules in a runtime production environment. If specified by the customizable business rules, transaction processor 116 initiates execution of the secondary financial transaction. The actual processing of the secondary transaction will be described in more detail below.

In one embodiment, this process can be executed in real-time to coincide with the merchant transaction (i.e., the primary transaction) at merchant site 120. In an alternative embodiment, the secondary transactions can be batch processed if transactions are not processed directly through EFT network 130. Moreover, secondary payments may be paid individually or aggregated (in a separate account or otherwise), and transferred to the specified destination account 150 when certain thresholds are met. For example, if the funds are to be transferred to a specific brokerage account requiring a minimum balance, the business rules can be defined to delay the actual transfer of funds until a sum of the secondary payments accumulates to the threshold amount (e.g., $1000, etc.). The aggregation of required funds can occur at card issuing bank 142 or any other appropriate account, which may be defined by the user via the customizable business rules. One important aspect is that no secondary payments will be triggered if such a transaction would result in overdrawing of the user's source account or if a penal interest rate or charge is incurred on that account. It should be clear that while this predefined protective limit is not necessary to implement the inventive system, this feature has obvious benefits and can further be set up by either user 140 or automatically by central system 110.

Examples of the calculation of secondary payment amounts as defined by a user's customized business rules include a percentage of the primary transaction, rounding up the primary transaction to a user specified level, a predetermined lump sum, or the like. It is reiterated that while these payments may be calculated using different methods, each of these transactions is a separate payment that is processed and reported independently of the primary transaction.

Furthermore, maximum and/or minimum thresholds for the primary transaction may be set in order to ensure that specified primary transactions (e.g., transactions under $10) do not trigger a secondary transaction. In addition, user interface 118*a* enables the user to define daily, weekly, monthly, and/or annual limits. Effectively, where certain tax free savings schemes limit a user's contribution to a maximum amount within a given time period, such as a year (e.g., a personal retirement account), central system 110 is configured to enable users to contribute to such accounts without worrying that more than the permissible amount is invested for that statutory time period. In a further aspect of this feature, any amounts above the permissible tax threshold that are routed to the designated account would be automatically rerouted to temporary holding accounts or secondary destination accounts as directed by the user. Funds in a temporary account could then be transferred once the appropriate tax limits were released.

As should be understood, user interface 118*a* provides the cardholder with absolute control over destination accounts 150. Effectively, there is no involvement required from any third party such as issuing bank 142 of the user's credit/debit cards. Advantageously, changes to the respective internal system of issuing bank 142 are not required, and, therefore, third party errors can be eliminated when defining the secondary transaction process. It is noted that in alternative embodiments, the cardholder may utilize the inventive system in conjunction with a third party such as his or her primary bank to register and establish the business rules.

Similar to the website portal provided to the cardholder, server 112 is further configured to provide a website portal to facilitate merchant registration with central system 110. It should be clear, however, that the inventive system is not limited to merchant registration via the website portal. In alternative embodiments, the system enables a merchant to register through a local bank or the like.

Using merchant interface 118*b*, a merchant at merchant site 120, for example, registers their participation in the rewards system to offer tertiary payments in the form of monetized rewards. These monetized rewards are paid directly to each user's predetermined destination account(s) 150 following the criteria set forth by cardholder's predefined business rules. Effectively, central system 110 provides merchants with tools to configure the level of rewards for cardholders to foster customer loyalty. Advantageously, merchants would benefit from a potentially cheaper alternative provided by the system when compared with a merchant's own loyalty programs, which can often be expensive to administer.

Merchant interface 118*b* is provided by server 112, enabling merchants to direct financial contributions to the user's savings to incentivize user loyalty and card preference. Based on the merchant's predefined business rules, a tertiary financial transaction will be initiated by central system 110 to debit the merchant's source account. More particular, once central system 110 receives electronic digital information concerning details of the primary transaction executed at a remote point-of-sale at merchant site 120, central system 110 analyzes the electronic digital information to determine whether the merchant's customer is registered with the inventive system. If so, and if the criteria defined by the merchant establishes that a tertiary transaction is to be processed, transaction processor 116 initiates execution of this tertiary transaction. It is noted that merchant site 120 can be a physical store or a merchant's website capable of execution of credit/debit card transactions or the like. Furthermore, it should be understood that while the tertiary transaction may be executed after execution of the secondary transaction in one embodiment, in an alternative embodiment, the tertiary transaction is triggered solely by the primary transaction.

By offering a tertiary payment, the merchant advantageously gets a complete customer view of value, rather than single card view. Customer loyalty is not tied into a single credit card; rather it is tied to the customer's identity since the customer can use any EFT payment network supported by the invention. For example, in one possible aspect, triggers can be set by merchants, via predefined business rules, that increase financial and non-financial incentives if the user provides the merchant with all of their business for a given good or service, or meets certain spending thresholds with the merchant. Customer spending, however, does not need to be executed using a single card, such as a rewards card or a gift card issued by the specific merchant.

In the exemplary embodiment, user participation needs to be instigated by the user via user interface 118*a*. However, in an alternative embodiment, cardholders are automatically enrolled in the merchants rewards program when they use their cards, even when they have not registered with central system 110. In one embodiment, the tertiary payments may be posted to a temporary account and the customer will be notified to confirm registration in the inventive system. This is facilitated by EFT network 130, making the growth of the reward program non-dependent upon user sign-up. Upon user acceptance, any temporarily posted payments will be forwarded to the relevant destination accounts 150 upon processing of the business rules as customized by the user during registration.

As should be apparent, merchants are provided with flexibility to define the calculation of tertiary payment accounts. For example, the merchant could offer tertiary payments in the form of a percentage of transactions; bonuses for meeting spending threshold, tiered rewards based upon timed spending criteria; discretionary or special promotions; and the like. Alternatively, merchants could offer non-payment tertiary rewards, such as Air Miles if the merchant is an airline or the like. In addition, merchant interface 118b enables the merchant to define prescribed ceilings for tertiary payments as well as means to target specific customer profiles. For example, it may be beneficial for merchants to offer increased rewards to bulk buying groups or to offer incentives for bulk purchasing. Alternatively, merchants may wish to provide additional incentives for customers to shop at certain times of the day/night which may help them to smooth traffic or increase traffic during slow periods. Furthermore, multiple merchants could jointly offer customer loyalty programs such as providing monetary rewards with other existing rewards schemes, such as Air Miles and the like.

It should be understood that central system 110 and/or transaction processor 116 can be implemented as a computer processing device, and in particular, any suitable device for performing computations in accordance with a computer program may be used. Examples of such devices include a personal computer, a laptop computer, a microprocessor, a programmable logic device, an application specific integrated circuit, or the like.

A recording media storing a computer program for accomplishing the above mentioned system and method may be accomplished by programming the applicable functions with a programming language readable by central system 110 and/or for transaction processor 116, and recording the program on a computer readable medium. Furthermore, server 112 can be equipped with a hard disk drive that may be employed as a recording media. It is also possible to accomplish the present invention by storing the above mentioned computer program on such a hard disk in server 112 and reading the computer program by other computers through a network.

It is also noted that the term "medium" includes, for instance, a disk shaped media such as CD-ROM (compact disc-read only memory), magneto optical disc or MO, digital video disc-read only memory or DVD-ROM, digital video disc-random access memory or DVD-RAM, a floppy disc, a memory chip such as random access memory or RAM, read only memory or ROM, erasable programmable read only memory or E-PROM, electrical erasable programmable read only memory or EE-PROM, a rewriteable card-type read only memory such as a smart card, a magnetic tape, a hard disc, and any other suitable means for storing a program and/or data therein.

Referring now to FIG. 2A, a method is illustrated for executing a secondary financial transaction in accordance with an exemplary embodiment of the invention. Initially, at step 205, cardholder 140 registers with central system 110. As discussed above, registration may include inputting a plurality of credit card numbers, debit card numbers, and the like, as well as defining business rules for controlling processing of the secondary financial transaction. Next, central system 110 generates a unique user ID linking the plurality of card numbers and business rules to registered cardholder 140. At this point, cardholder 140 can begin utilizing the advantages provided by central system 110.

Specifically, at step 215, a primary transaction is executed at an existing point-of-sale. As noted above, a primary transaction is generally a conventional user transaction involving a credit card, debit card or the like. For example, at the time of purchase, cardholder 140 presents a card, which has been registered with the system, for payment at remote point-of-sale such as merchant site 120. In response, a terminal at merchant site 120 transmits electronic digital information representing the transaction details to acquiring bank 122 for processing. Acquiring bank 122 combines the transaction information into an authorization request message and transmits it to EFT network 130. As is known, many financial institutions such as acquiring bank 122 will hire a third party for more cost-effective bankcard processing. As such, in one embodiment, acquiring bank 122 relays the card details and transaction amount to acquirer processor 124 for generation of the authorization request message.

In either embodiment, after the authorization request message is routed through EFT network 130, the authorization request message is forwarded to issuing bank 142 for review. Specifically, issuing bank 142 is the bank that has issued the particular credit/debit card used by cardholder 140 for the primary financial transaction. Similar to acquirer processor 124, issuing bank 142 may also employ a third party, i.e., issuer processor 144, for processing of the authorization request message. Upon review, issuing bank 142 (or issuer processor 144) sends an authorization response to EFT network 130 to either approve or decline the transaction. This authorization response is then routed through EFT network 130, which forwards the authorization response to acquiring bank 122 (or acquirer processor 124). Acquiring bank 142 then transmits the result of the authorization request to merchant site 120. Settlement of the primary transaction follows as per conventional clearing and settlement cycles. For example, after receiving the result of the authorization request, merchant site 120 transmits the sales information on either a periodic or specified basis as a clearing message to acquiring bank 122 and/or acquirer processor 124. This information is then routed through EFT network 130 to issuing bank 142 and/or issuer processor 144. Upon receipt, the settlement obligations are calculated and the amount due is transmitted from issuing bank 142 to acquiring bank 122. In another embodiment, these funds can be routed through settlement bank 160, which can be any entity of the associated EFT network (e.g., MasterCard®, Visa®, etc.).

It is further noted that in one embodiment, EFT network 130 may provide stand-in processing facilities to renew and authorize the transaction. As is known, stand-in authorization may be used if a communication link is unavailable, or as a measure to save communication cost or time. Stand-in authorization is subject to the transaction amount being below agreed limits, known as floor limits, which are calculated based on the risk of authorizing a transaction offline.

Referring back to FIG. 2A, once the primary transaction is executed at step 215, central system 110 determines whether one or more secondary transactions are to be executed. As discussed above, secondary transactions are based on business rules formerly defined by cardholder 140 for cards that have been registered with central system 110.

Specifically, following the return of a transaction approved message from issuing bank 122 (or acquirer processor 124), EFT network 130 transmits electronic digital information representing an additional payment message to central system 110 at step 220. It should be understood that in an alternative embodiment, where EFT network 130 provides stand-in processing, EFT network 130 will also transmit the additional payment message to central system 110 if the result of the stand-in processing is an approved transaction. As will be discussed below, central system 110 utilizes details in this additional payment message for processing of one or more secondary financial transactions.

In another embodiment, central system 110 is configured to transmit the unique user ID and associated credit and/or debit card numbers to the associated EFT network (e.g., Master-Card®, Visa®, etc.) at the time user 140 registers with central system 110. As such, the respective EFT network 130 can store this information in its server. Accordingly, upon execution of a primary transaction at merchant site 120, EFT network 130 analyzes the electronic digital information concerning the authorization request against current reference data to ascertain whether the particular card has been enrolled in the scheme. If the card is enrolled, EFT network 130 will identify and add the corresponding user ID to the electronic digital information that is transmitted to central system 110. In yet another embodiment, EFT network 130 further removes all transaction data that is not necessary for execution of the secondary transaction before transmitting the data to central system 110.

In either case, once central system 110 receives the additional payment message, central system 110 uses the credit/debit card number provided in the additional payment message to identify the registered cardholder 140 (step 225). In particular, central system 110 cross-references the credit/debit card number with the information in database 114 to identify cardholder 140. Alternatively, if EFT network 130 has already identified the unique user ID, central system 110 utilizes the provided unique user ID to begin processing of the secondary financial transaction.

In order to initiate execution of the one or more secondary transactions, transaction processor 116 applies the modified business rules and generates a new payment authorization request message to effect the one or more secondary transaction (step 230). As discussed above, the business rules may define the bank identification number, such as the routing number and bank account number, for both the source account and destination account 150, as well as the value of the secondary financial transaction(s). At step 230, server 112 forwards the newly generated payment request message(s) to EFT network 130, which routes them to issuing bank 142 (or its issuer processor 144) of the user. It is noted again that EFT network 130 may provide stand-in processing facilities for processing of the payment request as discussed above.

Upon receipt of the payment request message(s), issuing bank 142 (or its issuer processor 144) sends an authorization response to central system 110 at step 235. If central system 110 receives an authorization acceptance response, system data in database 114 is updated for the cardholder. Issuing bank 142 then sends the one or more secondary payment(s) to destination account(s) 150 as specified by the user-customized business rules (step 240). It is noted that the exemplary embodiment employs issuing bank 142 as the source account of the secondary transaction, however, in alternative embodiments, the source account can be any account as specified by the user, via the predetermined business rules.

Alternatively, if issuing bank 142 denies authorization and transmits an authorization message denied response to central system 110, a system alert is generated by central system 110 and associated information is transmitted back to the user's account defined in database 114 to advise the user of the failed secondary transaction. Central system 110 may further provide details to the user concerning the failed transaction, for example, if the designated destination account 150 has been closed or the like.

A further embodiment of the invention is illustrated in FIG. 2B. As discussed above, merchants are provided merchant interface 118b, via the website portal, enabling them to define business rules for execution of one or more tertiary transactions. Specifically, merchants are provided tools to define business rules that incentivize and reinforce customer loyalty. As noted above, a merchant may wish to provide certain financial incentives for a customer to purchase all of its goods from that merchant or to meet certain spending thresholds at that merchant's site(s) 120.

As shown, FIG. 2B is a continuation of the method shown in FIG. 2A. Specifically, once the primary transaction is completed at step 215 (shown in FIG. 2B), central system 110 determines whether one or more tertiary transactions are to be executed, by evaluating the merchant-defined business rules. As discussed above, server 112 provides a website portal with merchant interface 118b enabling merchants to predefine business rules specifying merchant loyalty rewards in the form of tertiary financial payments.

In particular, central system 110 applies the customized business rules previously defined by the card holder and the merchant to produce a new payment authorization request message at step 245. In particular, central system 110 is configured to evaluate the electronic digital information representing the details of the primary transaction (e.g., value of the transaction, good(s) purchased, etc.) and determine whether the merchant 120 at the remote point-of-sale has defined business rules that establish whether a tertiary transaction should be executed based on the details of the primary transaction.

If applicable, at step 250, central system 110 forwards a tertiary payment request to EFT network 130 which in turn routes the message to merchant bank 126. It is noted that in an alternative embodiment, EFT network 130 provides stand-in processing facilities. It is further noted that the invention is in no way intended to be limited to a single tertiary payment. Rather, central system 110 is capable of generating and transmitting multiple payment authorization request messages if so defined by the relevant business rules.

Upon receipt of tertiary payment request, merchant bank 126 sends an authorization response to central system 110 (step 255). If the tertiary transaction is approved by merchant bank 126, central system 110 updates user data stored in database 114. Furthermore, merchant bank 126 transmits the one or more tertiary payments to the one or more predefined destination accounts 150 as defined by the customer's pre-defined business rules (step 260). Similar to execution of the secondary payment as discussed above, if the authorization payment request is declined, central system 110 is configured to generate an alert and transmit corresponding account information to the customer's and merchant's system accounts in database 114 to advise of outstanding sums to reconcile.

FIG. 3 illustrates a flowchart for a method 300 for initiating execution of a financial transaction in accordance with another exemplary embodiment. Specifically, this embodiment is utilized when a user has not yet registered with the inventive system. As shown, initially at step 305, a primary transaction is executed at an existing point-of-sale. Once EFT network 130 routes electronic digital information to central system 110, central system 110 determines at step 310 whether the customer has previously registered with the inventive system. If the customer has already registered, secondary and tertiary transactions can be executed as discussed above with respect to FIGS. 2A and 2B and respective steps 220-260. In contrast, if the user has not yet registered, central system 110 generates a temporary unique user identification for the customer (step 315).

At step 320, a tertiary payment authorization request is generated by central system 110, which in turn, prompts a source account defined by the merchant, such as merchant bank 126, to post the one or more tertiary payments in a temporary holding account. At step 330, central system 110 contacts the user, via any standard method of communication such as email or text messaging, to prompt the user to confirm registration with the inventive system. At that point, the user can register with the inventive system and define user customizable business rules via user interface 118a. Moreover, a permanent unique user identification will be assigned to the user linking any credit card numbers, debit card numbers or the like with the customizable business rules. Once registered, an authorization response is transmitted at step 335 from central system 110 to merchant bank 126, via EFT network 130. The authorization response can include the routing number and bank account number of desired destination account 150. The authorization response in turn initiates transfer of the one or more tertiary accounts from the temporary holding account to the user's destination account 150 as defined by the business rules (step 340). Afterwards, any primary transactions executed by the newly-registered customer trigger secondary and/or tertiary transactions in accordance with the foregoing aspects of the present invention (see steps 220-260, for example). It should be clear, however, that if the user elects not to register with the system, the tertiary payment stored in the temporary holding account will be returned to the merchant's account at merchant bank 126.

As should be understood from the discussion above, all primary, secondary and tertiary transactions are mediated by EFT network 130. Conceived as a single global network, the movement of transaction payments from source accounts to destination accounts is controlled at the EFT network level, not by the issuing bank 142 and/or merchant bank 126. As a result, central system 110 can be integrated with the system of each card issuer as the payments are transferred over EFT network 130, using existing authorization and settlement processes. In this embodiment, no issuing bank will have any integration issues relating to this service, effectively reducing implementation costs to users and/or merchants. Furthermore, because the service uses EFT network 130, there will be minimal integration or development between payment network stakeholders.

While the exemplary embodiment discloses triggering a secondary financial transaction based on electronic digital information concerning details of a primary financial transaction, in another embodiment, the user's unique ID is distributed between all stakeholders in financial transaction network 100. Specifically, central system 110 may interact with any entity that is part of the transaction flow, including, but not limited to participating merchants, EFT networks, financial institutions, regional processors, national processors, issuer processors, acquirer processors, merchant acquirer processors, multiple EFT networks, transaction services providers and/or national, regional or global payment schemes.

By providing the unique ID to merchants, for example, merchants can identify the customer irrespective of the particular card used for the transactions. For instance, when a user transacts at merchant site 120, EFT network 130 inserts the ID number into the authorization response message. In situations where the merchant does not authorize a transaction through EFT network 130, EFT network 130 will insert the ID during the clearing and settlement process, thus ensuring that every transaction is populated with an ID. In the preferred embodiment, the EFT network will ensure that every cleared and settled transaction is populated with an ID if the transaction was generated by a registered card. In such an embodiment, the merchant then accepts the user ID number at authorization, or after clearing and settlement processes.

While the exemplary embodiment of the invention contemplates secondary and tertiary transaction being triggered from conventional credit/debit card purchases, in an alternative embodiment, secondary payments may be triggered when payments arrive into a user-specified account. For example, a user can define business rules such that his or her salary serves as the primary transaction. In this regard, the user can register issuing bank 142 in database 114 as the source account. Each time his or her salary is deposited at issuing bank 142, the deposit triggers a secondary transaction in accordance with the inventive features discussed above.

While the exemplary embodiment of the invention contemplates secondary and tertiary transaction being triggered from conventional credit/debit card purchases, in an alternative embodiment, secondary and tertiary transactions can be triggered from any mobile electronic payments device, ATM flows and the like.

In a further aspect, the user can define any number of source and destination accounts in accordance with the present invention. In one aspect, a user can define one or more investment accounts as the source and/or destination accounts. This offers financial institutions the opportunity to market their products and services on the user interface providing expansion of their revenue base. In another aspect, a user may direct third party investment accounts as the destination accounts. For example, several grandparents could contribute to a grandchild's college saving account or the like, via secondary payments.

As discussed above, the inventive system permits users to contribute set amounts to certain type of accounts, such as retirement accounts. For example, a user may wish to provide for a full IRA allocation over the course of the taxable year. More particularly, a user under 50 years of age may wish to contribute a maximum dollar amount according to the prevailing rules and regulations. As such, central system 110 is configured to provide guidance on the secondary payments necessary per transaction to ensure that the client remains on track over the course of the financial year. Specifically, if the client is ahead or behind their goal, central system 110, via user interface 118a, is configured to propose business rule changes to get back on track.

In accordance with this feature, destination accounts defined by the user can further include debt management repayment account, and the like. For example, the user could direct that a portion or all secondary and tertiary payments be used toward debt settlement. This functionality would assist those customers who are heavily in debt to make small regular affordable contributions to reduce their outstanding debt. Creditors and debtor could further establish agreements such that a percentage of funds from secondary and/or tertiary payments are used to repay outstanding balance. This feature may be especially useful to organizations that have lent money to customers on an unsecured basis and might otherwise have to write off the loans.

In another embodiment of the invention, user accounts of the inventive system may be integrated with other electronic payment platform. In one aspect of this embodiment, central system 110 is integrated with mobile phone platforms enabling users to make discretionary one-off contributions using their mobile phones. In yet a further aspect, mobile phone users can define rules linking bill payments and/or unused/overused allowances. For example, mobile phone companies can reward their clients by providing a tertiary payment/reward for those clients exceeding the minutes permitted by their mobile phone contract. Alternatively, mobile phone companies can provide partial rebates, rewards or other tertiary payments to customers who have not used their full minutes allocation in order to prevent them from "trading down" their existing contract.

In yet another aspect, independent financial advisors could define their clients' accounts as destination accounts 150, such that funds may be routed accordingly. As such, existing account holders of third party financial intermediaries or institutions can use the system to add to their existing savings and investment accounts. In this embodiment, the owner/manager of central system 110 can require a percentage of the up front payment as well as a percentage of the annual trail commission based on assets under management.

In a further embodiment, the owner/manager of central system 110 is provided with a number of revenue generating models based on cardholder and merchant use. For example, the inventive system may include a fixed or percentage fee levied on all secondary and tertiary transactions; participation fees for all cardholders; fees for any ancillary products or services selected by the cardholder; commissions due on assets under management; Annual Management Charge for assets under management; merchant participation fees; licensing fees for third party use of the system; advertising revenue generated by the website portal; and the like.

In a further aspect of the invention, because each primary, secondary and/or tertiary transaction is processed as a separate transaction, the transactions are also reported to the user as separate transactions. As such, the user payment amount for the primary transaction exactly matches the amount for the goods and services in which case there is therefore no ambiguity over excess amounts. Moreover, each of the secondary and/or tertiary payments appears as a separate transaction on credit/debit card statements, resulting in absolute clarity in the amount deposited in the statements of destination accounts 150. Effectively, the user is provided with transparent online reporting and management such that all credits and debits can be easily tracked for tax and accounting purposes and the like. In a further aspect of this embodiment, the inventive system provides reporting of secondary and tertiary transactions to a user via short message service (SMS) and/or email. Furthermore, via business rules, a user can manage their accounts by defining trigger information such that they receive notifications when their accounts cross certain spending or savings/investment thresholds.

The inventive system, in combination with EFT network(s) 130, offers the service to users under a range of suitable product offerings for their secondary payments. Such secondary payment may include savings and investment products, tithing & charitable offerings, loans and other financial products, and the like. For example, a credit card company could extend its business to replace hire purchase (HP) contracts in some developing economies and thereby encourage both the transition to the use of cards over 'cash' as well as increase transaction volume.

It is further noted that in some conventional transaction systems, in regions or geographies where bi-lateral agreements exist between issuing banks and merchants, or in the case of private label processing, the employed EFT network(s) may not see every transaction. According to another aspect of the invention, issuing banks 142 and/or issuer processors 144 who participate in the inventive program will allow EFT network 130 to receive transaction information and can support the debit and credit of funds through EFT network 130, irrespective of the geographic location of cardholder 140 and destination account 150 for the funds.

In a further aspect of the invention, individual issuing banks 142 often only offer a product to their existing customer base if they are required to verify data pertaining to the user for various regulatory and risk management reasons such as anti-money laundering. Accordingly, central system 110 or EFT network 130 provides a means to verify user data directly with financial institutions through existing validation processes (Address Verification, Card Verification e.g. CSC/CVV/CVVC/CVC/V Code) or enhanced services such as two-factor authentication (e.g., prompt and response, mother's maiden name, favorite pet, etc.) in order to be able to make the service available to all card users that register with central system 110. Moreover, central system 110 can further enable registration covering all "know your customer" (KYC) policies using a single click account opening. Additional embodiments could enable single click links for tax and regulatory information to enable expansion of destination account and associated services.

While the foregoing has been described in conjunction with an exemplary embodiment, it is understood that the term "exemplary" is merely meant as an example. Accordingly, the application is intended to cover alternatives, modifications and equivalents, which may be included within the spirit and scope of the invention.

Additionally, in the preceding detailed description, numerous specific details have been set forth in order to provide a thorough understanding of the present invention. However, it should be apparent to one of ordinary skill in the art that the inventive test circuit may be practiced without these specific details. In other instances, well-known methods, procedures, components, and circuits have not been described in detail so as not to unnecessarily obscure aspects of the invention.

What is claimed is:

1. A computer system for processing a secondary financial transaction that is initiated in response to a primary financial transaction, comprising:
   a computer configured to receive electronic digital information representing transaction details of a primary financial payment transaction;
   a computer readable electronic storage medium operably connected to said computer and configured to store customizable business rules that specify the conditions under which the computer system will initiate a secondary financial transaction in response to the received electronic digital information; and
   a transaction processor in operable communication with at least one of the computer and electronic storage medium that is configured to
   (a) determine whether the customizable business rules apply to the primary financial payment transaction based on the received electronic digital information, and
   (b) initiate execution of an independent secondary financial transaction upon a determination that one or more of the customizable business rules applies and that the one or more rules call for the initiation of the independent secondary financial transaction, wherein the secondary financial transaction is unrelated to the primary financial transaction other than by being initiated by the primary financial transaction, and wherein the details of the secondary financial transaction are controlled by one or more instructions contained in the customizable business rules.

2. The computer system of claim 1, wherein the customizable business rules are set by a user.

3. The computer system of claim 1, wherein the customizable business rules are set by a merchant.

4. The computer system of claim 1, wherein the computer is further configured to receive a plurality of account identifiers input by a user, and to generate a unique user identification number linking the plurality of account identifiers to the user.

5. The computer system of claim 4, wherein the account identifiers include one or more of the following: credit card numbers, debit card numbers, and payment card numbers.

6. The computer system of claim 1, wherein the computer is further configured to generate a temporary unique user identification number upon receipt of the electronic digital information.

7. The computer system of claim 4, wherein the computer is further configured to identify the associated customizable business rules using the unique user identification number, and wherein the execution of the secondary transaction is controlled by the identified customizable business rules.

8. The computer system of claim 1, wherein the transaction processor is further configured to initiate execution of one or more independent tertiary transactions that is triggered by the primary transaction.

9. The computer system of claim 8, wherein processing of the tertiary transaction is controlled by the customizable business rules, which are set by a merchant, via a user interface.

10. A computer-implemented method for processing a secondary financial transaction that is initiated in response to a primary financial transaction, the method comprising the steps of:

receiving in a computer system one or more customizable business rules for executing a secondary financial transaction following the execution of a primary financial transaction, the computer system including an electronic storage medium operably connected to a computer and a transaction processor operably connected to at least one of the electronic storage medium and the computer;

storing the customizable business rules in the electronic storage medium;

receiving in the computer system electronic digital information related to the primary financial transaction;

determining by the computer system whether one or more of the customizable business rules apply to the primary financial transaction based on the received electronic digital information for the primary financial transaction; and initiating by the transaction processor the execution of one or more secondary financial transactions upon a determination that one or more of the customizable business rules apply, wherein the secondary financial transaction is unrelated to the primary financial transaction other than by being by initiated by the primary financial transaction, and wherein the details of the secondary financial transaction are controlled by one or more instructions contained in the customizable business rules.

11. The computer-implemented method of claim 10, further comprising:
providing a user interface, via a website portal, to enable the user to set the customizable business rules.

12. The computer-implemented method of claim 11, further comprising:
receiving, by the computer system, a plurality of account identifiers input by the user via the user interface;
generating a unique user identification number, which associates the plurality of account identifiers to the user;
storing the unique user identification number in the electronic storage medium; and
linking the unique user identification number to the customizable business rules.

13. The computer-implemented method of claim 12, further comprising:
transmitting the unique user identification number to at least one of an electronic funds transfer network, an issuing bank, a merchant bank and a remote point-of-sale.

14. The computer-implemented method of claim 13, further comprising:
receiving, by the computer system, the unique user identification number, which is transmitted back to the computer system from the at least one of the electronic funds transfer network, the issuing bank, the merchant bank, and the remote point-of-sale, upon execution of the primary financial transaction requested by the user.

15. The computer-implemented method of claim 12, further comprising:
upon receiving the unique user identification number, identifying the customizable business rules that are linked to the unique user identification number; and
initiating, by a transaction processor, the execution of the secondary financial transaction.

16. The computer-implemented method of claim 10, further comprising:
initiating a tertiary financial transaction, which is triggered by the primary financial transaction, wherein the tertiary financial transaction is processed independently of the secondary financial transaction, and wherein the tertiary financial transaction is controlled by customizable business rules set by a merchant.

17. The computer-implemented method of claim 10, wherein the initiating step further comprises:
transmitting an authorization request to an electronic funds transfer network to execute the second transaction.

18. A computer system for processing a secondary financial transaction that is initiated in response to a primary financial transaction, comprising:
a computer configured to receive electronic digital information representing transaction details of a primary financial payment transaction of a user;
a computer readable electronic storage means operably connected to said computer and configured to store user-defined customizable business rules for executing a secondary financial transaction in response to the received electronic digital information;
means for receiving the electronic digital information related to the primary transaction executed by the user;
analyzing means for determining whether the customizable business rules apply to the primary financial payment transaction based on the received electronic digital information; and transaction processing means for initiating execution of one or more secondary financial transactions upon a determination that one or more of the customizable business rules apply.

19. The computer system of claim 18, further comprising:
means for receiving a plurality of account identifiers input by the user via a user interface;
generation means for generating a unique user identification number, which associates the plurality of account identifiers to the user;
electronic storage means for storing the unique user identification number; and
association means for linking the unique user identification number to the customizable business rules.

20. The computer system of claim 19, further comprising:
transmission means for transmitting the unique user identification number to at least one of an electronic funds transfer network, an issuing bank, a merchant bank and a remote point-of-sale.

21. The computer system of claim 20, further comprising:
receiving means for receiving the unique user identification number, which is transmitted back to the computer system from the at least one of the electronic funds transfer network, the issuing bank, the merchant bank, and the remote point-of-sale, upon execution of the primary financial transaction requested by the user;
identification means for identifying the customizable business rules upon receipt of the unique user identification number; and
transaction processing means for initiating execution of the secondary financial transaction.

22. A computer-implemented method for processing a secondary financial transaction initiated by the execution of a primary financial transaction, the method comprising the steps of:
receiving in a computer system one or more customizable business rules for executing a secondary financial transaction following the execution of a primary financial transaction, said computer system including an electronic storage medium, a transaction processor in operable communication with the electronic storage medium, and a web-based user interface for enabling a merchant to enter the customizable business rules into the computer system through a website portal;
storing the customizable business rules in the electronic storage medium;
receiving in the computer system electronic digital information related to a primary financial transaction executed by a user;
determining by the computer system whether one or more of the customizable business rules apply to the primary financial transaction based on the received electronic digital information for the first financial transaction; and;
initiating by the transaction processor the execution of one or more secondary financial transactions upon a determination that one or more of the customizable business rules apply;
storing a payment value associated with the secondary financial transaction in a temporary account;
querying the user to register with the computer system; and
initiating a transfer command to trigger the transfer of the payment value to a destination account once the user registers with the computer system.

* * * * *